July 19, 1955

K. SCHLESINGER 2,713,610

DISCRIMINATOR CIRCUIT

Filed Nov. 8, 1951

2 Sheets-Sheet 1

INVENTOR.
Kurt Schlesinger

BY

Foorman L. Mueller

Attys.

July 19, 1955 K. SCHLESINGER 2,713,610

DISCRIMINATOR CIRCUIT

Filed Nov. 8, 1951

2 Sheets-Sheet 2

INVENTOR.
Kurt Schlesinger

BY Foorman L. Mueller

Atty.

United States Patent Office 2,713,610

Patented July 19, 1955

2,713,610

DISCRIMINATOR CIRCUIT

Kurt Schlesinger, Maywood, Ill., assignor to Motorola, Inc., Chicago, Ill., a corporation of Illinois Application November 8, 1951, Serial No. 255,366

8 Claims. (Cl. 178—69.5)

The present invention relates to a television field discriminator circuit, and more particularly to a circuit for discriminating between the even and odd field vertical synchronization pulses of a television signal of the interlaced horizontal line type.

The standard television signal includes three types of synchronization pulse, i. e., horizontal pulses, equalizing pulses, and vertical pulses. The vertical pulse has a duration approximately equal to the occurrence of three pulses of the horizontal frequency, and is provided with serrations occurring at twice the horizontal frequency in order to provide a continuation of control of the horizontal frequency generator in the receiver during the vertical pulse intervals. In order to provide interlace of the horizontal lines, each picture frame is made up of two fields, and the successive vertical pulses for the alternate successive fields occur alternately in time and midway between the occurrence of horizontal frequency pulses. Thus the synchronization pulses for each field of the television signal may be identified by the instantaneous time occurrence of the vertical pulse in relation to the horizontal pulses. The so-called even field has a vertical pulse occurring in line with the horizontal pulses, and the so-called odd field has a vertical pulse occurring midway between the horizontal pulses.

It is desirable to discriminate between the even and odd field synchronization pulses to indicate which field is being transmitted or received at a given time. Such an indication may be useful for the control of other television circuits. For example, one proposed form of compatible color television system known as the oscillating color sequence system requires a variation of control of the color information sub-carrier in accordance with the transmission of even and odd fields of the television frame respectively.

It is an object of the present invention to provide a field discriminator circuit that is simple in form and will reliably indicate even and odd fields synchronization pulses respectively of a television signal.

Another object of the invention is to provide a television signal field discriminator which is operated and controlled solely by the synchronization pulses in the television signal.

A feature of the invention is the provision of a resonant circuit adapted to be resonated by the horizontal frequency pulses to provide a steady state response, and also to respond to the vertical pulses to provide a transient response, the total response of the resonator as determined by the time relationship between the horizontal and vertical synchronization pulses providing a maximum peak response upon the occurrence of the vertical pulse of either one or the other of even or odd field synchronization signals only depending upon the predetermined time relationship.

Another feature of the invention is the provision of two resonant circuits tuned slightly above and slightly below the horizontal pulse frequency to be resonated by the horizontal pulses, and having steady state responses leading or lagging the horizontal pulses in time by 60° and 120° respectively. Both of the resonant circuits have a transient response to the vertical pulses to form a combined steady state and transient response, with the resonant circuit tuned below the horizontal frequency producing a voltage peak occurring with the vertical pulse in the even field synchronization signals, and the resonant circuit tuned above the horizontal frequency producing a voltage peak occurring with the vertical pulse in odd field synchronization signals.

Another feature of the invention is the provision of a discriminator system including a circuit responsive to the application of the synchronization pulses of the television signals to produce two separate oscillatory voltage outputs, each voltage output having different oscillatory maximum voltage peaks coinciding with the application of an even field vertical pulse and an odd field vertical pulse respectively, and further including multivibrator circuit means responding to each of the voltage peaks to produce a single control signal having two voltage conditions indicative of even and odd television field synchronization pulses, respectively.

Further objects, features and the attending advantages of the invention will be apparent with reference to the following specification and drawings, in which.

Figure 1:
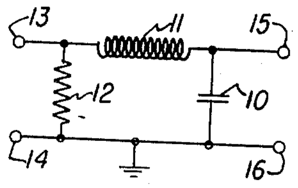
Fig. 1 is a simplified schematic of the resonant circuit or resonator as used in the invention.

In the following description and claims wherein the phase of a pulse or pulse train may be referred to it is to be understood that this refers to the fundamental component of the pulse wave and is representative of the instantaneous time occurrence of the leading edge of the pulse.

According to the invention, a pair of resonant circuits are connected to be energized or resonated by the synchronization pulses of a television signal. The coupling includes a resistance connected across the source of pulses which determines that the output of the resonant circuit when tuned to the occurrence frequency of the horizontal pulses will be of quadrature time relation to the phase of the horizontal pulses. The resonant circuit may comprise a series condenser and shunt inductance or series inductance and shunt condenser so that the phase relation of the output wave to the horizontal pulse timing will be ahead or behind respectively. In the specific example of the invention to be described a series inductance and shunt condenser is used so that the phase relation of the output wave is behind the timing of the horizontal pulses but it should be understood that the description of the invention and the appended claims are not to be limited to such embodiment since the system will operate equally well with a series condenser and shunt inductance.

One resonant circuit is detuned slightly lower in frequency than the frequency of the horizontal synchronization pulses to produce a steady state oscillatory signal voltage response 60° behind the time occurrence of the horizontal pulses, and the other resonant circuit is detuned slightly higher in frequency than the horizontal frequency to produce a steady state oscillatory signal voltage response 120° behind the time occurrence of the horizontal pulses. It has been observed that both resonant circuits have transient responses to the vertical synchronization pulses. The combined transient response and steady state response of the resonant circuit producing a signal voltage response 60° in time behind the horizontal pulses has a maximum peak voltage occurring immediately after the application of an odd field vertical synchronization pulse, which is the instant that the steady state voltage response has a maximum difference with respect to the vertical pulse voltage. On the other hand, the resonator having a steady state voltage response 120° in time behind of the horizontal pulse voltage has a maximum peak combined response immediately after the application of an even field synchronization vertical pulse which is the instant that its steady state voltage response is of the greatest difference with respect to the vertical pulse voltage. A peak voltage rectifying diode is connected to respond to the peak voltage of each resonant circuit to produce separate direct current voltage pulses for each resonant peak voltage indicative of even and odd field vertical synchronization pulses, respectively, and these voltage pulses are applied to a multivibrator circuit to produce a single control voltage having two values indicative of even and odd television fields respectively.

In Fig. 1 the resonant circuit is shown to be comprised of the condenser 10, inductance 11 and input impedance 12. Input terminals are shown at 13 and 14, and output terminals are shown at 15 and 16, the terminals 14 and 16 being connected together and to ground.

Figures 2, 3:
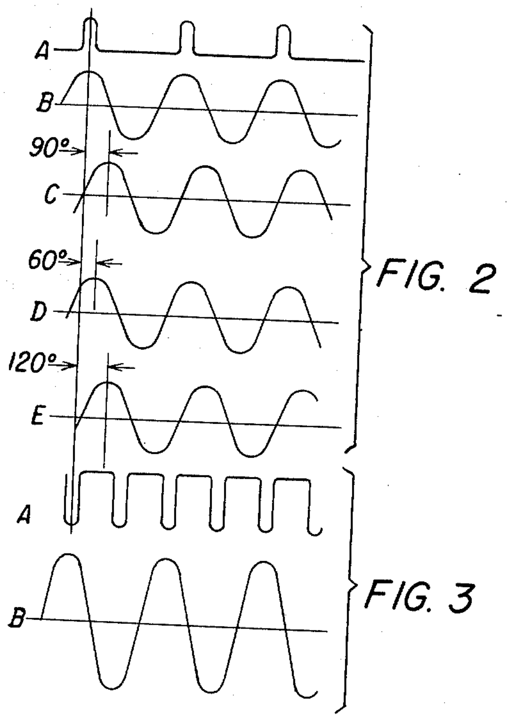
Fig. 2 is a family of curves to show voltage pulses of horizontal frequency and the various steady state responses of the resonator of Fig. 1 to the application of such pulses.
Fig. 3 is a family of curves to show the transient response of the resonator of Fig. 1 to a unit step signal similar to the vertical synchronization pulse.

When a pulse voltage, as shown by curve A of Fig. 2, having a frequency of 15,750 cycles per second which is the horizontal pulse frequency of a television signal is applied to the input terminals 13 and 14, and providing the resonant circuit is tuned to the horizontal pulse frequency, a steady state voltage lagging in time by 90° with respect to the pulse voltage as shown in curve C of Fig. 2, will appear across the output terminals 15 and 16. The fundamental wave for input pulse voltage of curve A is shown by curve B. Now, if the resonant circuit is detuned slightly below the horizontal frequency the voltage output as shown by curve D will lag slightly behind the normal 90° phase relationship to the pulse voltage input and if the resonant circuit is detuned slightly higher than the horizontal pulse frequency, the output voltage will, as shown by curve E, be slightly ahead of the normal 90° phase relationship to the pulse voltage input. This phase relationship is a function of frequency and Q of the resonant circuit. With a Q of about 15 and a normal resonant frequency of 15,750 cycles per second, a phase relationship 60° behind the time occurrence of horizontal pulses as shown by curve D, may be obtained if the resonant circuit is tuned to about 15,450 cycles per second. Similarly, if the resonant circuit is tuned to about 16,050 cycles per second, the time relationship will be 120° behind, as shown by curve E.

The resonant circuit of Fig. 1 when tuned to respond to the horizontal pulse frequency or a frequency very close to the horizontal pulse frequency, also has a transient response to a unit step signal, such as the vertical pulse shown by curve A of Fig. 3, and such transient response is shown by curve B of Fig. 3.

With reference to curves A through F of Fig. 4, the combined response to the synchronization pulses of a television signal by two resonant circuits tuned slightly above and below the horizontal frequency respectively to have time relationship to the horizontal pulse voltage of 60° and 120° lagging respectively are shown substantially as they have been observed on an oscilloscope. Curves A and D show the television synchronization signals for successive even and odd fields respectively and including horizontal pulses 20, equalizing pulses 21, and vertical pulses 22, with vertical pulse serrations 23. The television synchronization signals, as shown are of the standard form, which is well known and need not be further described. Curves B and E show the steady state response combined with the transient response of the resonant circuit tuned 300 cycles above resonant frequency to have a time relationship to the horizontal pulse voltage of 120° behind. As shown by curve B, a maximum peak voltage response 25 is obtained shortly after the occurrence of the even field vertical pulse of the synchronization signals of curve A. At that time the instantaneous difference in values of the steady state voltage response of curve B and the voltage of the vertical pulse of curve A is greatest. Such voltage difference is greater than the voltage difference between the vertical pulse 22 of curve D and the instantaneous value of the steady state response of curve E so that the resonant circuit of curves E and B is discriminatory to provide the maximum voltage peak 25 only in response to the occurrence of the even field vertical pulse. Similarly, the curves C and F which show the steady state response and combined transient response of the resonant circuit tuned 300 cycles lower than the horizontal frequency to have a time relationship of steady state response 60° behind the horizontal pulse frequency, indicates that the second circuit has a maximum peak voltage 27 responsive only to the occurrence of the odd field vertical pulse. Although the tuning of the resonant circuits to frequencies 300 cycles above or below the horizontal pulse frequency is specifically mentioned, it should be understood that the invention is not limited to such specific frequencies of operation. It will be noted that the combined steady state and transient response as shown in Fig. 4 of the drawings actually results in a slight additional lagging of the peak response to occur substantially in time with the first serration of the vertical pulse.

Figure 5:
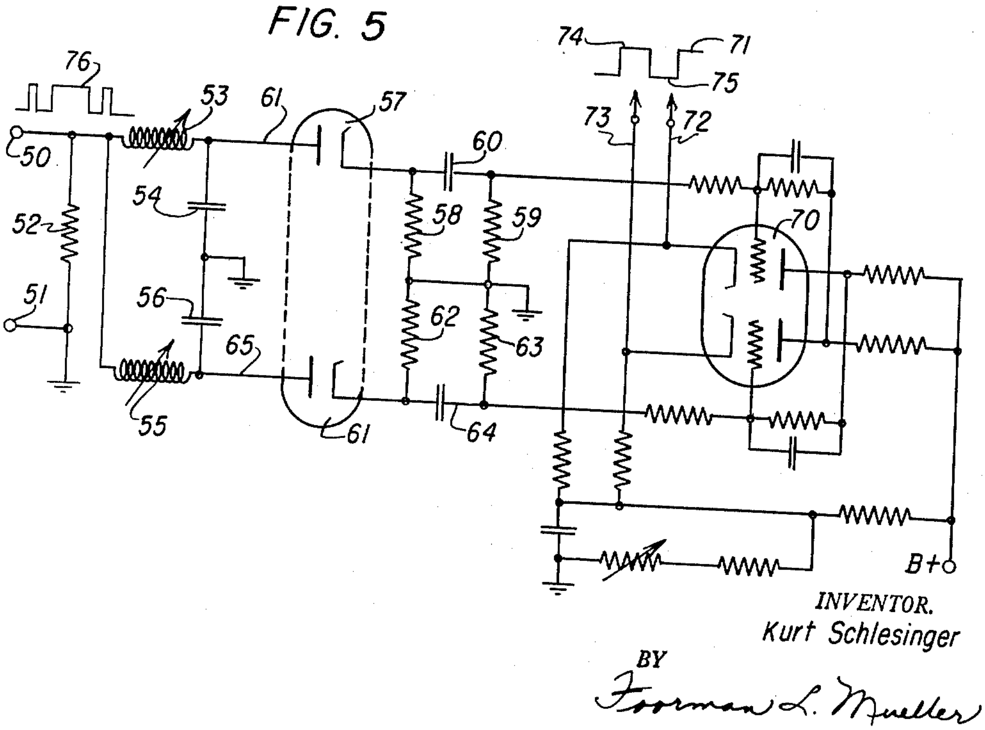
Fig. 5 is a wiring diagram of a working embodiment of the invention.

In Fig. 5 of the drawings, the television synchronization signals are applied across input terminals 50 and 51 and the input impedance 52. A first resonant circuit comprising the inductance 53 and condenser 54 is formed with a Q of approximately 15 and is tuned to approximately 15,450 cycles per second. A second resonant circuit comprising the inductance 55 and condenser 56 is formed with a Q of approximately 15 and is tuned to approximately 16,050 cycles per second. Thus the resonant circuit of inductance 53 and condenser 54 has a response similar to that shown by curves C and F of Fig. 4, while the resonant circuit including inductance 55 and condenser 56 has a response similar to that shown by curves B and E of Fig. 4.

Figure 4:
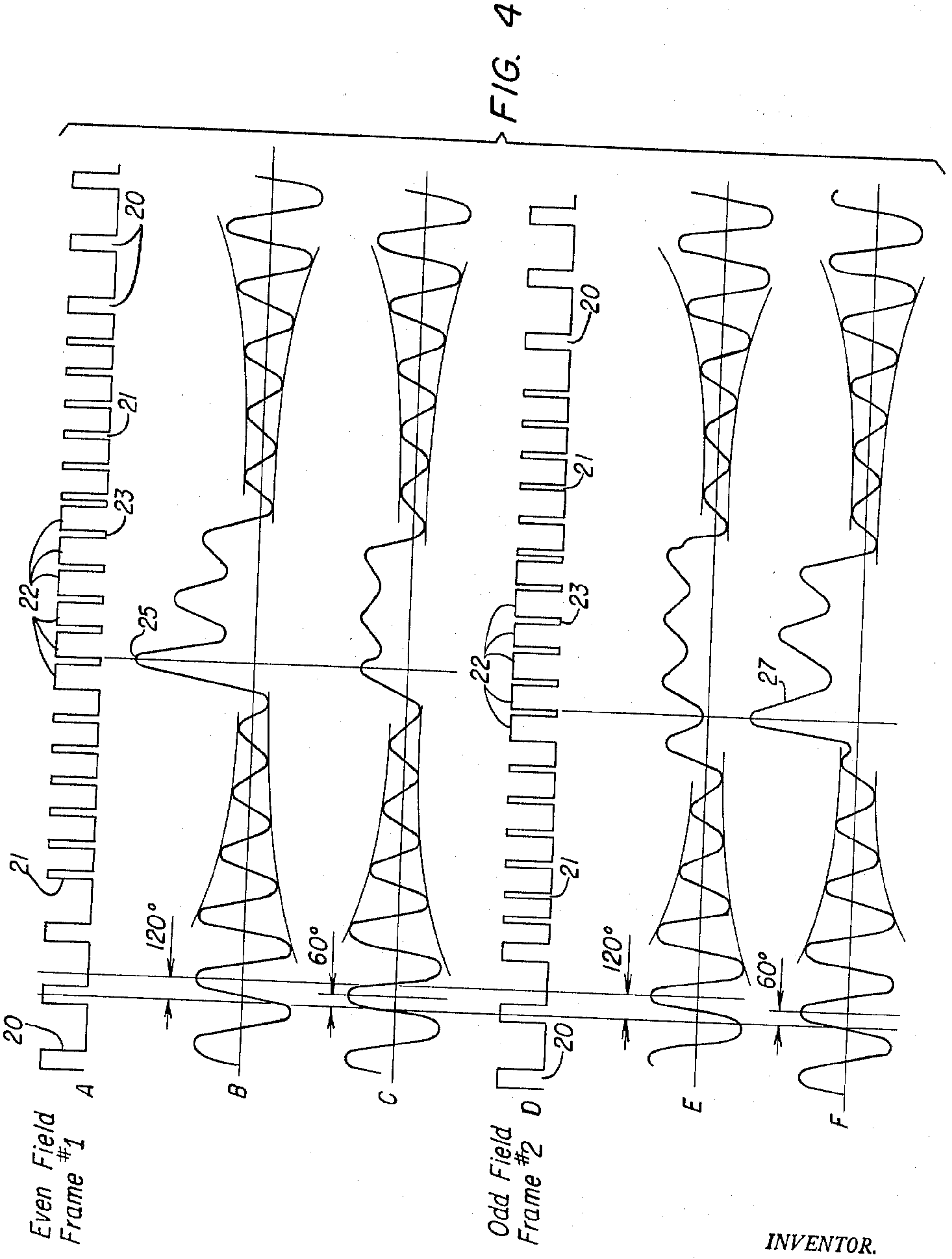
Fig. 4 is a family of curves to show the total combined transient and steady state response of two of the resonators in Fig. 1 to the television signal synchronization pulses, each resonator tuned slightly above and below the horizontal pulse frequency respectively.

A diode 57 connected in a peak voltage rectifying circuit including resistors 58, 59 and condenser 60 is connected to the output terminal 61 to produce a positive voltage pulse across resistor 59 whenever the maximum voltage peak 25 of curve B in Fig. 4 corresponding in time to the application of even field vertical pulses occurs. Similarly, the diode 61 is connected in a peak voltage rectifying circuit including resistors 62, 63 and condenser 64 to the output terminal 65 to produce a corresponding positive voltage pulse across resistor 63 corresponding in time to the occurrence voltage peak 27 and odd field vertical pulses.

A multivibrator electronic switch circuit including the triode tube 70 is connected to be activated by the positive pulses appearing across resistors 59 and 63 to produce a single control voltage 71 across the output terminals 72 and 73. The control voltage 71 will have two amplitude values or conditions as shown at 74 and 75 which are indicative of even and odd field synchronization pulses respectively. The operation of the multivibrator electronic switch circuit to produce the control voltage 71 is believed to be well known and need not be further described in detail. The control voltage 71 whose relative values are indicative of the occurrence of even and odd field synchronization pulses of the television signal may be used for various control purposes in a television receiver or transmitter.

The resonant circuits shown in Fig. 5 including inductances 53, 55 and condensers 54, 56 are connected to respond to positive polarity synchronization pulses 76 for producing the above described discriminator action. If negative polarity synchronization pulses are to be applied, the arrangement of inductances and condensers in the resonant circuit should be reversed, assuming that the time relation of the resonant response to the horizontal pulse occurrence is to be lagging. If the arrangement of inductances and condensers is not reversed the response of the system to negative polarity synchronization pulses will be ahead in time with the horizontal pulse occurrence.

In the foregoing a discriminator circuit for indicating the occurrence of even and odd television field pulses of a television signal has been described, the circuit being controlled solely by the synchronization pulses of the television signal to obtain the maximum in reliability and simplicity.

It should be apparent that various modifications may be made within the spirit of the invention and the scope of the appended claims.

I claim:

1. A discriminator circuit adapted to discriminate between even and odd field synchronization pulses of a television signal having successive even and odd field horizontal line interlace and including horizontal synchronization pulses and vertical synchronization pulses, with the vertical pulse for the even field occurring in time with the horizontal pulses and the vertical pulse for the odd field occurring midway between the time of the horizontal pulses, said circuit including in combination, a first resonant circuit having input and first output terminals, means to apply the synchronization pulses of the television signal to the input terminals of said first resonant circuit, said first resonant circuit being tuned to a frequency slightly higher than the frequency of said horizontal pulses to produce at said first output terminals a steady state signal voltage response 120° differing in time with said horizontal frequency pulses, a second resonant circuit having input and second output terminals, means to apply the synchronization pulses of the television signal to the input terminals of said second resonant circuit, said second resonant circuit being tuned to a frequency slightly lower than the frequency of said horizontal pulses to produce at said second output terminals a steady state signal voltage response 60° differing in time with said horizontal frequency pulses, each of said resonant circuits producing at their respective output terminals a transient response to the occurrence of vertical pulses, said first resonant circuit having a combined maximum peak voltage response to the occurrence of the vertical synchronization pulses of the even fields, said second resonant circuit having a combined maximum peak voltage response to the occurrence of the vertical synchronization pulses of the odd fields, first indicating means connected to said first output terminals to respond to the peak voltage output of said first resonant circuit to indicate the occurrence of even fields, and second indicating means connected to said second output terminals to respond to the peak voltage output of said second resonant circuit to indicate the occurrence of odd fields.

2. A circuit adapted to produce pulses in response to the field synchronization pulses of a television signal having successive even and odd field horizontal line interlace and including line and field synchronization pulses with the field pulses for even fields occurring in time with the line pulses and the field pulses for odd fields occurring midway between the time occurrence of the line pulses, said circuit including in combination, first and second resonant circuits, means for applying the synchronization pulses of the television signal to said resonant circuits, said first resonant circuit being tuned to a frequency slightly higher than the frequency of said line pulses to produce a steady voltage wave the phase of which differs slightly more than 90° from the time occurrence of said line frequency pulses, said second resonant circuit being tuned to a frequency slightly lower than the frequency of said line pulses to produce a steady voltage wave the phase of which differs slightly less than 90° from the time occurrence of said line frequency pulses, each of said resonant circuits producing a transient wave in response to the occurrence of each field synchronization pulse and combining said transient waves with said steady voltage wave therein, said transient waves in said first resonant circuit having such phase relations with said steady voltage wave therein that the combined wave resulting from an even field synchronization pulse has a peak voltage response substantially greater than that of a combined wave resulting from an odd field synchronization pulse, and said transient waves in said second resonant circuit having such phase relations with said steady voltage wave therein that the combined wave resulting from an odd field synchronization pulse has a peak voltage response substantially greater than that of a combined wave resulting from an even field synchronization pulse, and means coupled to said resonant circuits responsive to said maximum peak voltage responses.

3. A system for developing pulses in response to field synchronization pulses of a television signal including line synchronization pulses and field synchronization pulses with the field pulses for even fields occurring in time with the line pulses and the field pulses for odd fields occurring midway between the time occurrence of the line pulses, said system including in combination, a resonant circuit having input and output terminals, means for applying the synchronization pulses of the television signal to said input terminals, said resonant circuit being tuned to a frequency differing slightly from the frequency of said line pulses to produce at said output terminals thereof a steady voltage wave having a phase relation with respect to the time of occurrence of said line pulses differing slightly from a 90° relation, said resonant circuit producing a transient wave in response to the occurrence of each field synchronization pulse, said transient waves produced by said odd and even field synchronization pulses having such phase relations with said steady voltage wave that the combination of said steady voltage wave with one of said transient waves in said resonant circuit produces a substantially higher peak voltage output than the combination of said steady voltage wave with the other transient wave, and means connected to said output terminals of said resonant circuit to respond to said higher peak voltage output of said resonant circuit.

4. A system for developing pulses in response to field synchronization pulses of a television signal having successive even and odd field interlace and including line synchronization pulses and field synchronization pulses with the field pulses for even fields occurring in time with the line pulses and the field pulses for odd fields occurring midway between the time occurrence of the line pulses, said system including in combination, a resonant circuit having input and output terminals, means for applying the synchronization pulses of the television signal to said input terminals, said resonant circuit being tuned to a frequenty slightly higher than the frequency of said line pulses to produce at said output terminals thereof a steady voltage wave having a phase differing with respect to the time of occurrence of said line pulses by slightly more than 90°, said resonant circuit producing a transient wave in response to the occurrence of each field synchronization pulse, said transient waves produced by even field synchronization pulses having a phase relation with said steady voltage wave such that the combination thereof in said resonant circuit produces a substantially higher peak voltage output than the combination of said steady voltage wave with said transient waves produced by said odd field synchronization pulses, and means connected to said output terminals of said resonant circuit to respond to said higher peak voltage output of said resonant circuit.

5. A system for developing pulses in response to field synchronization pulses of a television signal having successive even and odd field interlace and including line synchronization pulses and field synchronization pulses with the field pulses for even fields occurring in time with the line pulses and the field pulses for odd fields occurring midway between the time occurrence of the line pulses, said system including in combination, a resonant circuit having input and output terminals, means for applying the synchronization pulses of the television signal to said input terminals, said resonant circuit being tuned to a frequency slightly lower than the frequency of said line pulses to produce at said output terminals thereof a steady voltage wave having a phase differing with respect to the time of occurrence of said line pulses by slightly less than 90°, said resonant circuit producing a transient wave in response to the occurrence of each field synchronization pulse, said transient waves produced by odd field synchronization pulses having a phase relation with said steady voltage wave such that the combination thereof in said resonant circuit produces a substantially higher peak voltage output than the combination of said steady voltage wave with said transient waves produced by said even field synchronization pulses, and means connected to said output terminals of said resonant circuit to respond to said higher peak voltage output of said resonant circuit.

6. A discriminator system adapted to discriminate between even and odd field synchronization pulses of a television signal having successive even and odd field horizontal line interlace and including horizontal frequency pulses having a frequency of 15,750 cycles per second, and vertical pulses having a frequency of approximately 60 cycles per second, the vertical pulse for the even field synchronization signals occurring in time with the horizontal pulses, the vertical pulse for the odd field synchronization signals occurring midway between the time of occurrence of the horizontal pulses, including in combination, a first resonant circuit having input and first output terminals, means to apply the synchronization pulses of the television signal to the input terminals of said first resonant circuit, said first resonant circuit having a Q of 15 and tuned to a frequency of 16,050 cycles per second to produce at said first output terminals a steady state signal voltage response 120° differing in time with the occurrence time of said horizontal frequency pulses, a second resonant circuit having input and second output terminals, means to apply the synchronization pulses of the television signal to the input terminals of said second resonant circuit, said second resonant circuit having a Q of 15 and tuned to a frequency of 15,450 cycles per second to produce at said second output terminals a steady state siginal voltage response 60° differing in time with the occurrence time of said horizontal frequency pulses, each of said resonant circuits producing at their respective output terminals a transient response to the occurrence of vertical pulses, said first resonant circuit having a combined maximum peak voltage response to the occurrence of the vertical pulse of the even field synchronization signals, said second resonant circuit having a combined maximum peak voltage response to the occurrence of the vertical pulse of the odd field synchronization signals, first indicating means connected to said first output terminals to respond to the peak voltage output of said first resonant circuit to indicate the occurrence of even fields, and second indicating means connected to said second output terminals to respond to the peak voltage output of said second resonant circuit to indicate the occurrence of odd fields.

7. The invention of claim 1 in which said first indicating means comprises a first rectifier connected to rectify the maximum peak voltage produced by said first resonant circuit to form a first voltage pulse therefrom, and said second indicating means comprises a second rectifier connected to rectify the maximum peak voltage produced by said second resonant circuit to form a second voltage pulse therefrom, a multivibrator electronic switch, and means to connect said first and second voltage pulses to actuate said electronic switch to produce a single voltage signal having two voltage variations, synchronized in time with the occurrence of even and odd fields respectively.

8. A discriminator circuit adapted to discriminate between even and odd field synchronization pulses of a television signal having successive even and odd field horizontal line interlace and including horizontal synchronization pulses and vertical synchronization pulses, the vertical pulse for the even field occurring in time with the horizontal pulses, the vertical pulse for the odd field occurring midway between the time occurrence of the horizontal pulses, said circuit including in combination, a first resonant circuit having input and first output terminals, means to apply the synchronization pulses of the television signal to the input terminals of said first resonant circuit, said first resonant circuit being tuned to a frequency slightly higher than the frequency of said horizontal pulses to produce at said first output terminals a steady state signal voltage response differing slightly more than 90° with the time occurrence of said horizontal frequency pulses, a second resonant circuit having input and second output terminals, means to apply the synchronization pulses of the television signal to the input terminals of said second resonant circuit, said second resonant circuit being tuned to a frequency slightly lower than the frequency of said horizontal pulses to produce at said second output terminals a steady state signal voltage response differing slightly less than 90° with the time occurrence of said horizontal frequency pulses, each of said resonant circuits producing at their respective output terminals a transient response to the occurrence of vertical pulses, said first resonant circuit having a combined maximum peak voltage response to the occurrence of the vertical pulse of the even field synchronization signals, said second resonant circuit having a combined maximum peak voltage response to the occurrence of the vertical pulse of the odd field synchronization signals, first indicating means connected to said first output terminals to respond to the peak voltage output of said first resonant circuit to indicate the occurrence of even fields, and second indicating means connected to said second output terminals to respond to the peak voltage output of said second resonant circuit to indicate the occurrence of odd fields.

References Cited in the file of this patent

UNITED STATES PATENTS

| | | |
|---|---|---|
| 2,413,913 | Duke | Jan. 7, 1947 |
| 2,511,146 | Beste | June 13, 1950 |
| 2,546,972 | Chatterjea | Apr. 3, 1951 |
| 2,570,775 | De Baun | Oct. 9, 1951 |